United States Patent
Gao

(10) Patent No.: US 11,858,618 B2
(45) Date of Patent: Jan. 2, 2024

(54) UAV FOOT STAND AND UAV

(71) Applicant: AUTEL ROBOTICS CO., LTD., Guangdong (CN)

(72) Inventor: Han Gao, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 17/812,949

(22) Filed: Jul. 15, 2022

(65) Prior Publication Data

US 2022/0363372 A1 Nov. 17, 2022

Related U.S. Application Data

(63) Continuation of application No. PCT/CN2020/137323, filed on Dec. 17, 2020.

(30) Foreign Application Priority Data

Jan. 17, 2020 (CN) .......................... 202020116963.9

(51) Int. Cl.
*B64C 25/06* (2006.01)
*B64U 60/30* (2023.01)
*B64U 60/50* (2023.01)

(52) U.S. Cl.
CPC .............. *B64C 25/06* (2013.01); *B64U 60/30* (2023.01); *B64U 60/50* (2023.01)

(58) Field of Classification Search
CPC ......... B64C 25/06; B64C 25/32; B64U 60/30; B64U 60/50
See application file for complete search history.

(56) References Cited

U.S. PATENT DOCUMENTS

2017/0361924 A1   12/2017   Himmelmann

FOREIGN PATENT DOCUMENTS

| CN | 205872445 U | 1/2017 |
|----|-------------|--------|
| CN | 206367580 U | 8/2017 |
| CN | 207045705 U | 2/2018 |
| CN | 207328813 U | 5/2018 |
| CN | 109641651 A | 4/2019 |
| CN | 211731793 U | 10/2020 |
| KR | 20200078894 A | * 7/2020 |

OTHER PUBLICATIONS

Thekiinngg DJI Mavic Leg Replacement Leg https://www.amazon.com/DJI-Mavic-Replacement-Landing-Right/dp/B079R36R1S (Year: 2017).*
PCT International Search Report dated Mar. 16, 2021; PCT/CN2020/137323 with English translation

* cited by examiner

*Primary Examiner* — Richard G Davis

(57) ABSTRACT

Embodiments of the present application are a UAV foot stand and a UAV. The UAV foot stand includes a main body, a mounting board, and a support structure, where one end of the main body is provided with a lightening cavity, one end of the main body that is provided with the lightening cavity extends outward to form the mounting board, the support structure is fixed to the main body, and the support structure at least partially extends into the lightening cavity and is connected to an inner wall of the lightening cavity, so as to increase rigidity of the main body.

15 Claims, 2 Drawing Sheets

UAV FOOT STAND AND UAV

CROSS-REFERENCE TO RELATED APPLICATIONS

The present application is a continuation of International Application No. PCT/CN2020/137323, filed on Dec. 17, 2020, which claims priority to Chinese Patent Application No. 202020116963.9, filed on Jan. 17, 2020, which is incorporated herein by reference in its entirety.

TECHNICAL FIELD

Embodiments of the present utility model relate to the field of unmanned aerial vehicle (UAV) technologies, and in particular, to a UAV foot stand and a UAV.

BACKGROUND

An unmanned aerial vehicle (UAV) is a type of unmanned aerial vehicle operated by a radio remote control device and a self-provided program control device. Currently, the UAV technology has reached maturity in terms of civilian use, and more and more users take pictures or photograph through a UAV equipped with an image obtaining device. Understandably, the popularity of the UAV greatly facilitates the way people live and work. Generally, the UAV includes a fuselage, a plurality of arms mounted on the fuselage, and a motor, a propeller, and a UAV foot stand that are separately mounted to the arms. The UAV flies by driving the propeller to rotate by the motor, and the UAV foot stand abuts against the ground to support the UAV when landing.

The inventor of the present utility model found in a process of implementing the present utility model: during the flight of the UAV, high-speed rotation of the propeller brings periodic vibrations. When a vibration frequency is close to a resonant frequency of the UAV foot stand, the UAV foot stand is prone to resonate with the propeller; and a maximum amplitude of resonance can reach more than 10 mm, and the damage caused by the amplitude to the UAV is huge at a vibration frequency of several hundred hertz, which not only affects the normal flight of the UAV, but also causes a gimbal and other functional components to fail to operate normally, and further causes damage to a structure of the UAV foot stand.

SUMMARY

Embodiments of the present utility model aim to provide an unmanned aerial vehicle (UAV) foot stand and a UAV, so as to resolve the technical problem that a propeller is prone to resonate with the UAV foot stand during the flight of the UAV.

The embodiments of the present utility model adopt the following technical solution to resolve the technical problem.

A UAV foot stand includes a main body, a mounting board, and a support structure, where the end of the main body is provided with a lightening cavity, one end of the main body that is provided with the lightening cavity extends outward to form the mounting board, the support structure is fixed to the main body, and the support structure at least partially extends into the lightening cavity and is connected to an inner wall of the lightening cavity, so as to increase rigidity of the main body.

As a further improvement solution of the foregoing technical solution, the support structure comprises a first reinforcing rib, wherein the first reinforcing rib is accommodated in the lightening cavity in a direction parallel to a radial direction of the lightening cavity, two ends of the first reinforcing rib are separately connected to the inner wall of the lightening cavity in an axial direction of the lightening cavity, and the first reinforcing rib extends from one end that is close to the mounting board to one end that faces away from the mounting board.

As a further improvement solution of the foregoing technical solution, the support structure further comprises a second reinforcing rib, wherein the second reinforcing rib is accommodated in the lightening cavity in a direction parallel to the radial direction of the lightening cavity, two ends of the second reinforcing rib are separately connected to the inner wall of the lightening cavity in the axial direction of the lightening cavity, and the second reinforcing rib extends from one end that is close to the mounting board to one end that faces away from the mounting board.

As a further improvement solution of the foregoing technical solution, the second reinforcing rib is arranged orthogonal to the first reinforcing rib, or the second reinforcing rib is arranged parallel to the first reinforcing rib.

As a further improvement solution of the foregoing technical solution, the support structure comprises a butting portion and a connection portion, the butting portion is annular, the butting portion at least partially extends into the lightening cavity and is attached to the inner wall of the lightening cavity, one end of the butting portion that is close to the mounting board extends outward to form the connection portion, and the connection portion is fixed to the mounting board.

As a further improvement solution of the foregoing technical solution, the support structure is made of metal.

As a further improvement solution of the foregoing technical solution, the support structure is detachably fixed to the mounting board;

or the support structure is injection-molded together with the main body and the mounting board as an insert.

As a further improvement solution of the foregoing technical solution, the UAV foot stand further includes a protective wall, where the protective wall is annular, one end of the protective wall is connected to the mounting board, and an other end of the protective wall extends toward one end that is away from the main body.

The embodiments of the present utility model further adopt the following technical solution to resolve the technical problem.

A UAV includes a fuselage and arms mounted on the fuselage, and further includes a UAV foot stand as described above, where the UAV foot stand is mounted to the arm through a mounting board.

As a further improvement solution of the foregoing technical solution, the UAV further includes a positioning module, where the positioning module includes a boss and a groove that match with each other, one of the boss and the groove is provided at one end of the mounting board that is close to the arm, and an other of the boss and the groove is provided at one end of the arm that is close to the mounting board.

Beneficial Effects of the Utility Model:

The UAV foot stand provided in this embodiment of the present utility model includes a main body, a mounting board, and a support structure, where one end of the main body is provided with a lightening cavity, one end of the main body that is provided with the lightening cavity extends outward to form the mounting board, the support structure is fixed to the main body, and the support structure at least partially extends into the lightening cavity and is connected to an inner wall of the lightening cavity, so as to increase rigidity of the main body. Through the foregoing arrangement, the overall rigidity of the UAV foot stand is enhanced, and the resonant frequency of the UAV foot stand is correspondingly increased; and under the condition that a vibration frequency of the propeller remains unchanged, the resonant frequency of the UAV foot stand cannot be reached during the propeller being switched on to rotating stably. Therefore, the UAV foot stand provided in the present utility model can avoid the hidden danger that the propeller resonates with the UAV foot stand.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present utility model, the present utility model is described in more detail below with reference to the accompanying drawings and specific embodiments. It should be noted that, when a component is expressed as "being fixed to", "being connected to", or "being mounted to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, meanings of all technical and scientific terms used in the present utility model are the same as that usually understood by a person skilled in the technical field to which the present utility model belongs. Terms used in the specification of the present utility model are merely intended to describe objectives of the specific embodiment, and are not intended to limit the present utility model. A term "and/or" used in this specification includes any or all combinations of one or more related listed items.

In addition, technical features involved in different embodiments of the present utility model described below may be combined together if there is no conflict.

In this specification, the expression "mount" means to fix or restrict an element or an apparatus to a specific position or place in a manner including welding, screwing, snapping, bonding, and the like. The element or the apparatus may keep still at the specific position or place or move within a limited range. The element or the apparatus can be disassembled or cannot be disassembled after being fixed or restricted to the specific position or place, which is not limited in the embodiments of the present utility model.

Figure 1:
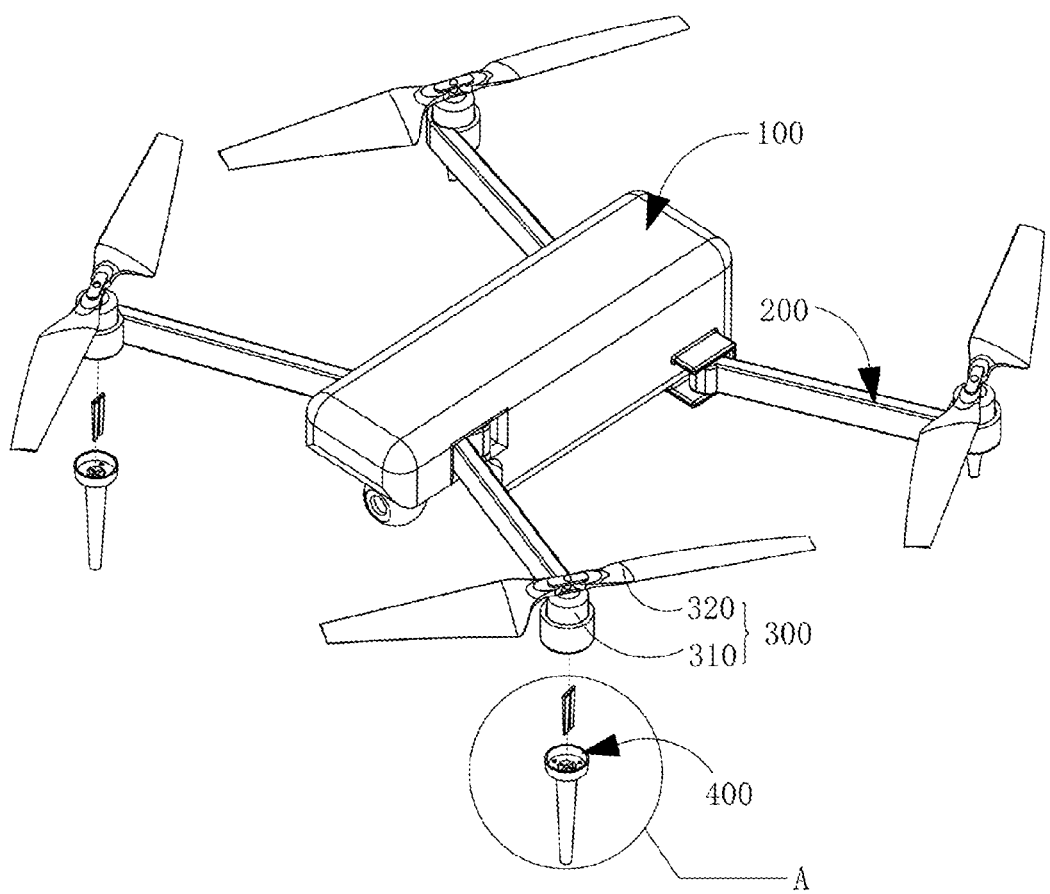
FIG. 1 is an exploded schematic diagram of an unmanned aerial vehicle (UAV) according to one of the embodiments of the present utility model.
Figure 2:
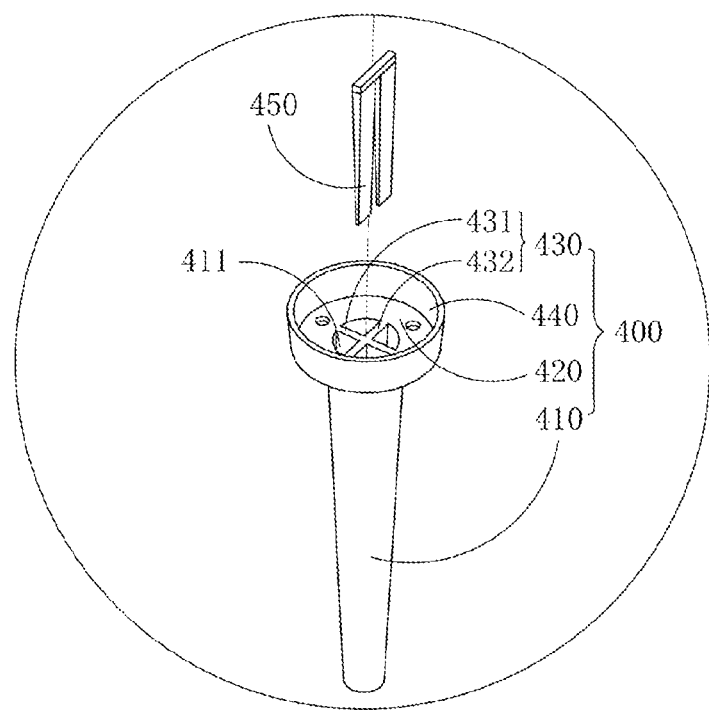
FIG. 2 is a partially enlarged schematic diagram of a portion A in FIG. 1.

Referring to both FIG. 1 and FIG. 2, FIG. 1 and FIG. 2 separately show an exploded schematic diagram of an unmanned aerial vehicle (UAV) according to one of the embodiments of the present utility model and a partially enlarged schematic diagram of a portion A. The UAV includes a fuselage 100, an arm 200, a power assembly 300, and a UAV foot stand (hereinafter referred to as foot stand) 400. One end of the arm 200 is fixed to the fuselage 100, and an other end extends toward one end that is away from the fuselage 100. The power assembly 300 is fixed on a top portion of one end of the arm 200 that is away from the fuselage 100. The foot stand 400 is fixed on a bottom portion of one end of the arm 200 that is away from the fuselage 100.

For the power assembly 300, referring to FIG. 1, the power assembly 300 includes a motor 310 and a propeller 320. The top portion of one end of the arm 200 that is away from the fuselage 100 is provided with a first mounting groove, and the motor 310 is mounted in the first mounting groove. The propeller 320 is connected to an output end of the motor 310, and can rotate under the driving of the motor 310, so as to provide power for the UAV to fly.

Figure 3:
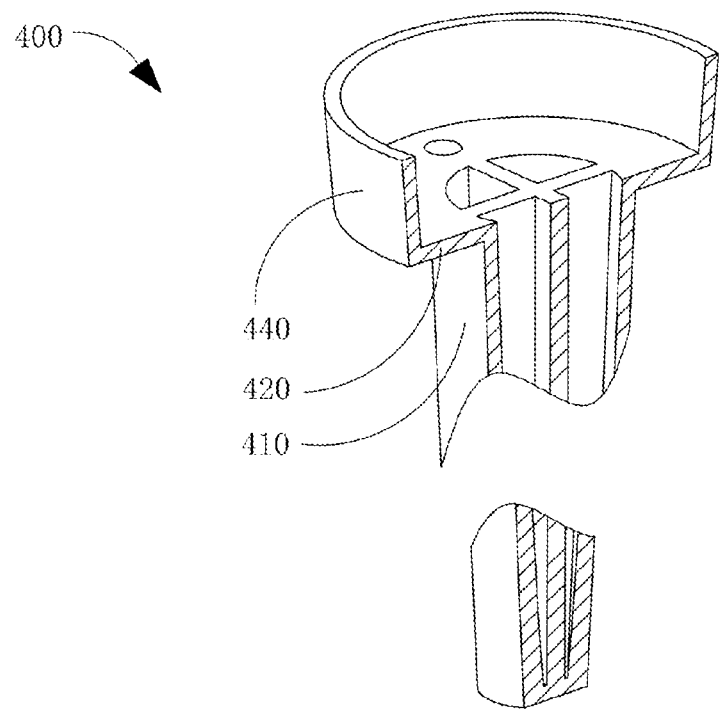
FIG. 3 is a schematic cross-sectional diagram in a direction of a UAV foot stand in FIG. 1.

For the foot stand 400, referring to FIG. 3, FIG. 3 shows a schematic cross-sectional diagram in a direction of the foot stand 400 according to one of the embodiments of the present utility model. Referring to both FIG. 1 and FIG. 2, the foot stand 400 includes a main body 410, a mounting board 420, and a support structure 430. One end of the main body 410 is connected to the bottom portion of one end of the arm 200 that is away from the fuselage 100, and an other end extends toward one end that faces away from the top portion of the arm 200. One end of the main body 410 that is close to the arm 200 is provided with a lightening cavity 411, and the lightening cavity 411 extends from one end that is close to the arm 200 toward a direction that is away from the arm 200. One end of the main body 410 that is provided with the lightening cavity 411 extends outward in a radial direction to form a mounting board 420, and is connected to the arm 200 through the mounting board 420. Specifically, the mounting board 420 is provided with a through connecting hole, and the bottom portion of one end of the arm 200 that is away from the fuselage 100 is provided with a connecting post (not shown) that is adapted to the arm 200 at a corresponding position. An end surface of one end of the connecting post that faces away from the motor 310 is provided with a threaded hole, the connecting post is inserted into the connecting hole, and a threaded fastener passes through the connecting hole and is threadedly connected to the connecting post, thereby fixing the mounting board 420 to the arm 200; and that is, the main body 410 is indirectly fixed to the arm 420 through the mounting board 420. The support structure 430 is fixed to the main body 410, and at least partially extends into the lightening cavity 411 and is connected to an inner wall of the lightening cavity 411, so as to increase the rigidity of the main body 410.

In this embodiment, the support structure 430 includes a first reinforcing rib 431, and the first reinforcing rib 431 has a strip-shaped structure as a whole and is accommodated in the lightening cavity 411. In a direction parallel to a radial direction of the lightening cavity 411, two ends of the first reinforcing rib 431 are separately connected to the inner wall of the lightening cavity 411; and in an axial direction of the lightening cavity 411, the first reinforcing rib 431 extends from one end that is close to the mounting board 420 to one end that faces away from the mounting board 420.

To further strengthen the rigidity of the foot stand 400, the support structure 430 further includes a second reinforcing rib 432. The second reinforcing rib 432 has a strip-shaped structure as a whole and is accommodated in the lightening cavity 411. In a direction parallel to a radial direction of the lightening cavity 411, two ends of the second reinforcing rib 432 are separately connected to the inner wall of the lightening cavity 411; and in an axial direction of the lightening cavity 411, the second reinforcing rib 432 extends from one end that is close to the mounting board 420 to one end that faces away from the mounting board 420. In this embodiment, the second reinforcing rib 432 is arranged orthogonal to the first reinforcing rib 431; it can be understood that a positional relationship between the second reinforcing rib 432 and the first reinforcing rib 431 is not specifically limited in the present utility model; and for example, in other embodiments of the present utility model, the second reinforcing rib is arranged in parallel with the first reinforcing rib.

Further, to cause the lightening cavity 411 to be in a sealed state as a whole, so as to implement airtight mounting of an antenna 450 and prevent the antenna 450 from being exposed to the outside, the foot stand 400 further includes a protective wall 440. The protective wall 440 has an annular structure, one end of the protective wall 440 is connected to an edge of the mounting board 420 in an axial direction of the protective wall 440, and an other end of the protective wall 440 extends toward one end that is away from the main body 410 and abuts against the bottom portion of the arm 200.

Still further, to facilitate the positioning and mounting of the foot stand 400, the UAV further includes a positioning module (not shown). Specifically, the positioning module includes at least one group of boss and groove that match with each other, one of the boss and the groove is provided at one end of the mounting board 420 that is close to the bottom portion of the arm 200, and an other of the boss and the groove is provided at one end of the arm 200 that is close to the mounting board 420. Then, the foot stand 400 can be quickly positioned with the arm 200 through the positioning module. In addition, the positioning module can further increase the rigidity of the foot stand 400 in a circumferential direction while assisting the foot stand 400 in positioning.

Generally, as the rigidity of an object increases, the resonant frequency of the object also increases accordingly. Taking advantage of this feature, currently, when overcoming the defect that the UAV foot stand resonates with the propeller, UAV manufacturers on the market generally adopt a more rigid composite material as a material (such as polymer materials with glass fiber or carbon fiber) for the UAV foot stand, the resonant frequency of the UAV foot stand increases accordingly, so that the vibration frequency of the propeller never reaches the resonant frequency of the UAV foot stand during the propeller being switched on to rotating smoothly, so as to avoid the disadvantage that the UAV foot stand resonates with the propeller. Although the UAV foot stand made of the material has a relatively high rigidity, the brittleness of the UAV foot stand also increases accordingly. Therefore, in a process that the UAV lands or falls, the possibility that the damage is caused to the UAV foot stand also increases accordingly.

The UAV provided in this embodiment includes a fuselage 100, an arm 200, a power assembly 300, and a foot stand 400. The foot stand 400 includes a main body 410, a mounting board 420, and a support structure 430. One end of the main body is provided with a lightening cavity 411, and one end of the main body 410 that is provided with the lightening cavity 411 extends outward to form the mounting board 420. The support structure 430 is fixed to the main body 410, and the support structure 430 at least partially extends into the lightening cavity 411 and is connected to one end of the inner wall of the lightening cavity 411 that is close to the mounting board 420 to increase the rigidity of the main body 410. Under the condition that the vibration frequency of the propeller 320 remains unchanged, the resonant frequency of the UAV foot stand provided in the present utility model becomes higher. Therefore, the UAV provided in the present utility model can avoid the hidden danger that the propeller resonates with the UAV foot stand.

Figure 4:
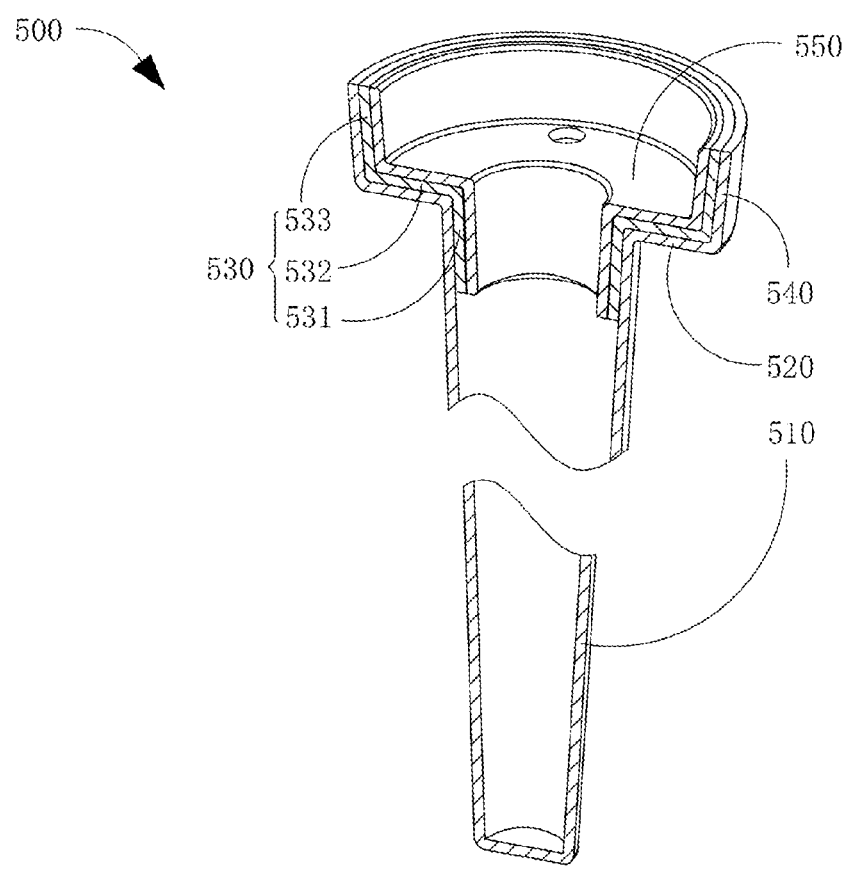
FIG. 4 is a schematic cross-sectional diagram in a direction of a UAV foot stand according to another embodiment of the present utility model.

Referring to FIG. 4, FIG. 4 shows a UAV foot stand (hereinafter referred to as foot stand) 500 according to another embodiment of the present utility model. Referring to both FIG. 1 to FIG. 3, main differences between the UAV foot stand 500 and the foot stand 400 in the previous embodiment are:

In the first embodiment, the support structure 430 in the foot stand 400 includes a first reinforcing rib 431 and a second reinforcing rib 432, which are in a direction parallel to a radial direction of the lightening cavity 411. Two ends of the first reinforcing rib 431 and the second reinforcing rib 432 are separately connected to the inner wall of the lightening cavity 411 to strengthen the torsional rigidity of the main body 410, thereby increasing the rigidity of the foot stand 400; and In the second embodiment, the support structure 530 of the foot stand 500 does not include the first reinforcing rib and second reinforcing rib, but includes a ring-shaped butting portion 531 that is attached to the inner wall of the lightening cavity, and strengthens the rigidity of the main body 510 through the attachment between the butting portion 531 with the inner wall of the lightening cavity, thereby enhancing the overall rigidity of the foot stand 500.

Specifically, the foot stand 500 includes a main body 510, a mounting board 520, a support structure 530, and a protective wall 540. The support structure 530 is a lining structure, which includes a butting portion 531, a connecting portion 532, and an abutting portion 533. The butting portion 531 has a ring-shaped structure as a whole, at least partially extends into the lightening cavity 411, and is attached to the inner wall of the lightening cavity 411. One end of the butting portion 531 that is close to the mounting board 520 extends outward to form a connection portion 532, and the connection portion 532 is carried on the mounting board 520. The abutting portion 533 has an annular structure as a whole, one end of the abutting portion 533 is connected to the connection portion 532 in an axial direction of the abutting portion 533, and an other end extends toward one end that is away from the connection portion 532 and is attached to the inner wall of the protective wall 540. Preferably, the support structure 530 is made of metal to ensure the rigidity of the support structure 530, thereby providing the rigidity of the foot stand 500.

In this embodiment, the support structure 530 is fixed to the mounting board 520 by a fixing member 550 whose shape is adapted to the support structure 530. Specifically, the fixing member 550 includes an abutting section, a connection section, and an abutting section. The butting section is an annular structure, which at least partially extends into an inner hole formed by the butting portion 531 and is attached to an inner wall of the butting portion 531.

One end of the butting section that is close to the mounting board 520 extends outward in a radial direction to form the connection section, and the connection section is carried on the connection portion 532. The abutting section has an annular structure as a whole, one end of the abutting section is fixed to an edge of the connection section in an axial direction of the abutting section, and an other end extends toward one end that is away from the connection section and is attached to the inner wall of the abutting portion. The fixing member 550 is fixed to the mounting board 520 by a threaded fastener or other detachable connection manners, so that the support structure 530 is firmly mounted on the mounting board 520. It can be understood that, in the foregoing embodiments, the support structure 530 is fixed to the mounting board 520 in a detachable manner, but the present utility model is not limited thereto; and for example, in some other embodiments of the present utility model, the support structure is injection-molded together with the main body, the mounting board, and the protective wall as an insert.

It can be understood that, in some cases, the fixing member 550 may be omitted, and the support structure 530 is directly fixed to the mounting board by a threaded fastener or other detachable connection manners. In addition, it should be understood that the specific form of the support structure is not limited to the structural forms provided in the foregoing two embodiments, and can further be other forms, provided that the support structure at least partially extends into the lightening cavity and is connected to the inner wall of the lightening cavity, and can increase the rigidity of the main body of the UAV foot stand, thereby increasing the rigidity of the UAV foot stand. Correspondingly, the antenna can also be changed according to the specific structure of the support structure.

Finally, it should be noted that the foregoing embodiments are merely used for describing the technical solutions of the present utility model, but are not intended to limit the present utility model. Under the concept of the present utility model, the technical features in the foregoing embodiments or different embodiments may be combined, the steps may be implemented in any sequence, and there may be many other changes in different aspects of the present utility model as described above. For brevity, those are not provided in detail. Although the present utility model is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present utility model.

What is claimed is:

1. An unmanned aerial vehicle (UAV) foot stand, comprising: a main body, a mounting board, and a support structure, wherein one end of the main body is provided with a lightening cavity, the end of the main body that is provided with the lightening cavity extends outward to form the mounting board, the support structure is fixed to the main body, and the support structure at least partially extends into the lightening cavity and is connected to an inner wall of the lightening cavity, so as to increase rigidity of the main body; wherein the support structure comprises a first reinforcing rib, wherein the first reinforcing rib is accommodated in the lightening cavity in a direction parallel to a radial direction of the lightening cavity, two ends of the first reinforcing rib are separately connected to the inner wall of the lightening cavity in an axial direction of the lightening cavity, and the first reinforcing rib extends from one end that is close to the mounting board to one end that faces away from the mounting board.

2. The UAV foot stand according to claim 1, wherein the support structure further comprises a second reinforcing rib, wherein the second reinforcing rib is accommodated in the lightening cavity in a direction parallel to the radial direction of the lightening cavity, two ends of the second reinforcing rib are separately connected to the inner wall of the lightening cavity in the axial direction of the lightening cavity, and the second reinforcing rib extends from one end that is close to the mounting board to one end that faces away from the mounting board.

3. The UAV foot stand according to claim 2, wherein the second reinforcing rib is arranged orthogonal to the first reinforcing rib, or the second reinforcing rib is arranged parallel to the first reinforcing rib.

4. The UAV foot stand according to claim 1, wherein the support structure comprises a butting portion and a connection portion, the butting portion is annular, the butting portion at least partially extends into the lightening cavity and is attached to the inner wall of the lightening cavity, one end of the butting portion that is close to the mounting board extends outward to form the connection portion, and the connection portion is fixed to the mounting board.

5. The UAV foot stand according to claim 4, wherein the support structure is made of metal.

6. The UAV foot stand according to claim 5, wherein the support structure is detachably fixed to the mounting board; or the support structure is injection-molded together with the main body and the mounting board as an insert.

7. The UAV foot stand according to claim 1, further comprising a protective wall, wherein the protective wall is annular, one end of the protective wall is connected to the mounting board, and an other end of the protective wall extends toward one end that is away from the main body.

8. An unmanned aerial vehicle (UAV), comprising a fuselage and arms mounted on the fuselage, and further comprising the UAV foot stand,
wherein the UAV foot stand comprising: a main body, a mounting board, and a support structure, wherein one end of the main body is provided with a lightening cavity, the end of the main body that is provided with the lightening cavity extends outward to form the mounting board, the support structure is fixed to the main body, and the support structure at least partially extends into the lightening cavity and is connected to an inner wall of the lightening cavity, so as to increase rigidity of the main body; wherein the UAV foot stand is mounted to the arm through the mounting board; wherein the support structure comprises a first reinforcing rib, wherein the first reinforcing rib is accommodated in the lightening cavity in a direction parallel to a radial direction of the lightening cavity, two ends of the first reinforcing rib are separately connected to the inner wall of the lightening cavity in an axial direction of the lightening cavity, and the first reinforcing rib extends from one end that is close to the mounting board to one end that faces away from the mounting board.

9. The UAV according to claim 8, wherein the support structure further comprises a second reinforcing rib, wherein the second reinforcing rib is accommodated in the lightening cavity in a direction parallel to the radial direction of the lightening cavity, two ends of the second reinforcing rib are separately connected to the inner wall of the lightening cavity in the axial direction of the lightening cavity, and the second reinforcing rib extends from one end that is close to the mounting board to one end that faces away from the mounting board.

10. The UAV according to claim 9, wherein the second reinforcing rib is arranged orthogonal to the first reinforcing rib, or the second reinforcing rib is arranged parallel to the first reinforcing rib.

11. The UAV according to claim 8, wherein the support structure comprises a butting portion and a connection portion, the butting portion is annular, the butting portion at least partially extends into the lightening cavity and is attached to the inner wall of the lightening cavity, one end of the butting portion that is close to the mounting board extends outward to form the connection portion, and the connection portion is fixed to the mounting board.

12. The UAV according to claim 11, wherein the support structure is made of metal.

13. The UAV according to claim 12, wherein the support structure is detachably fixed to the mounting board;
or the support structure is injection-molded together with the main body and the mounting board as an insert.

14. The UAV according to claim 8, further comprising a protective wall, wherein the protective wall is annular, one end of the protective wall is connected to the mounting board, and an other end of the protective wall extends toward one end that is away from the main body.

15. The UAV according to claim 8, wherein the UAV further comprises a positioning module, wherein the positioning module comprises a boss and a groove that match with each other, one of the boss and the groove is provided at one end of the mounting board that is close to the arm, and an other of the boss and the groove is provided at one end of the arm that is close to the mounting board.

* * * * *